March 27, 1962     H. LIBERTY     3,027,128

CLAMPS FOR PIPES, CABLES, AND THE LIKE

Filed May 12, 1959

Inventor:
Harry Liberty,

United States Patent Office 3,027,128
Patented Mar. 27, 1962

3,027,128
CLAMPS FOR PIPES, CABLES, AND THE LIKE
Harry Liberty, 10640 S. Claremont Ave., Chicago, Ill.
Filed May 12, 1959, Ser. No. 812,671
6 Claims. (Cl. 248—74)

This invention relates to improvements in clamps for pipes, cables, and the like. Generally stated, these clamps are used for gripping and supporting pipes, cables, and the like, to structures such as walls, ceilings, and other supporting elements in the well known and widely used manner.

Briefly stated, the clamps herein disclosed are formed from blanks of sheet metal or other suitable material, to provide a base section which may be secured to the supporting element in convenient manner, as by the use of a screw or lag bolt, or the like. Such clamp is also provided with a pair of ears or arms which extend out from such base section far enough to receive the pipe of other supported unit between them with support for such pipe or other unit at some distance from the surface of the supporting element to which the clamp is thus connected. For this purpose such ears or arms are conventionally provided with rounded or concaved proximate surfaces between which the pipe or other unit is gripped. Conventionally such gripping is effected in previously known devices by the use of through bolts or the like, extended through the projecting end portions of such ears or arms, so that by tightening such bolts the desired gripping action may be produced. Such arrangements as heretofore widely used are subject to serious objections and disadvantages, some of which are as follows:

The upwardly extending ears or arms materially increase the overall dimension of the unit, measured from the structural element to which such unit is attached, so that it is necessary to ensure ample clearance to accommodate such added dimension of the unit. Furthermore, when the pipe or cable or other element is set into the clamp its ears or arms must be spread apart to establish sufficient clearance to permit the introduction of the pipe or cable. Afterwards it is customary to bend the ears or arms together or towards each other prior to introduction of the bolt through such elements; but even so, such bolt must be of excessive length to extend through such still somewhat separated ears or arms, and to enable threading of the nut onto the projecting end of the bolt after such bolt has been so set through the ears or arms. Thereafter by tightening up the nut the ears or arms may be drawn together to grip the pipe or cable, but when this has been done a considerable portion of the bolt will remain beyond the final position of the nut. It is then customary to cut off such excess length of the bolt, but evidently such bolt cannot afterwards be re-used when the nut is removed and the ears or arms are again spread apart to replace or substitute another pipe or cable into the clamp.

It is a prime object of the present invention to provide a new and improved means for connecting the two ears or arms of the clamp together after the pipe or cable has been set into place between them, such novel arrangement being such that no bolt or other element extraneous to the clamp itself is needed to effect the joining and clamping together of the two ears or arms. The arrangement is such that when the two ears or arms are drawn together tightly against the pipe or cable, to grip the same, such ears or arms may be hooked together by a simple operation to lock them in gripping condition without the need of using any special tool or implement. The arrangement is also such that the operation of drawing the ears or arms towards each other to clamp the pipe or cable between them prior to such hooking operation, may be performed by any simple convenient tool, such as a screw-driver or a straight, slim bar, or the like. The units herein disclosed are also so formed that as the gripping of the pipe or cable occurs some slight accommodation of the ears or arms occurs to ensure good gripping action on the pipe or cable, regardless of the exact diameter of such element, within reasonable tolerances of manufacture of the pipes and cables normally expected in commercial operation. It is thus possible to ensure that a strong gripping action will be produced when the companion hooking elements of the ears or arms of the clamp are produced according to a standard spacing or sizing of parts, notwithstanding slight variations in the diameters of the pipes or cables to be gripped by such clamps. Additionally a further tightening of the gripping action may be produced after the hooking operation has occurred, such further tightening operation being performed by slightly bending one of the hook elements in the tightening direction after the hooking operation has been performed.

Further objects of the invention are to provide a form of clamp which can be readily produced by conventional sheet or strip metal forming operations, by the use of simple dies, either progressive or otherwise, and from metal of widely used compositions, since such metal does not need to have a high degree of elasticity, nor a degree of elasticity greater than that usually found in carbon steels and the like.

Other objects and uses of the invention will appear from a detailed description of the same, which consists in the features of construction and combinations of parts hereinafter described and claimed.

In the drawing:

FIGURE 1 shows an edge view of a clamp embodying the features of my present invention, with the wrapping ear or arm bent away from the hook ear or arm sufficiently to allow the pipe or cable to be set down between such ears or arms by a further slight spreading of the ears or arms from each other; and in this embodiment the lower portions of such ears or arms are so formed with respect to the connecting or base portion of the clamp that during the tightening of the ears or arms against the embraced pipe or cable, some deflection of such lower portions may occur without deformation beyond the elastic limit of the metal, so that good clamping action may be produced as desired, and with accommodation for slight tolerances in sizes of the pipes or cables to be accommodated and gripped;

Figures 1, 3:
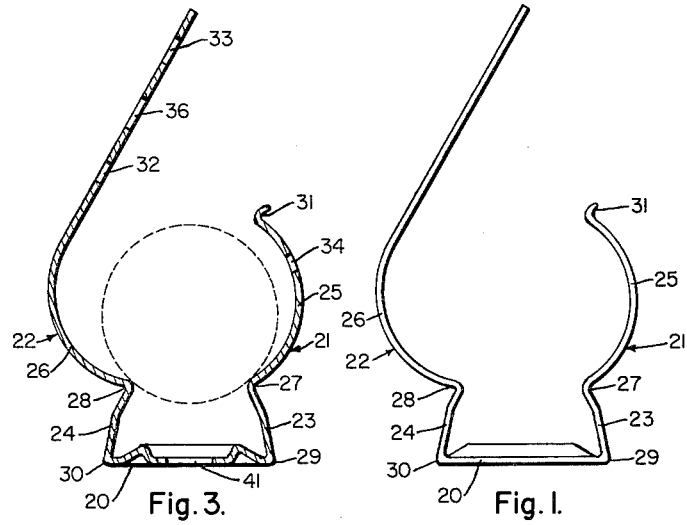
FIGURE 3 is a section taken on the line 3—3 of FIGURE 2, looking in the direction of the arrows; and in this figure the introduced pipe or cable is typically shown by the dotted circle.
Figures 4, 5:
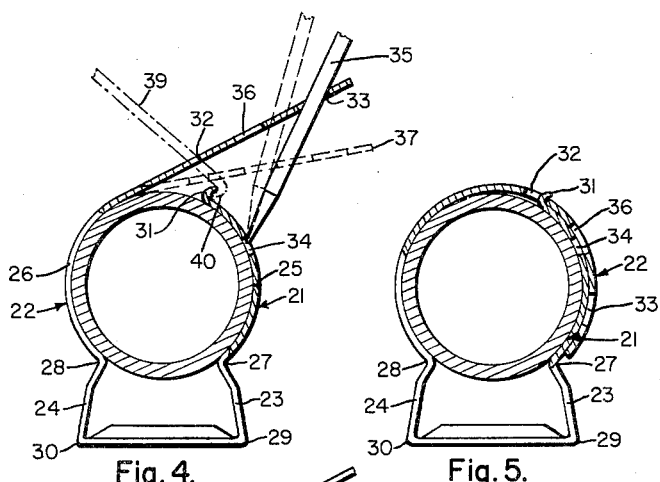
Figure 6:
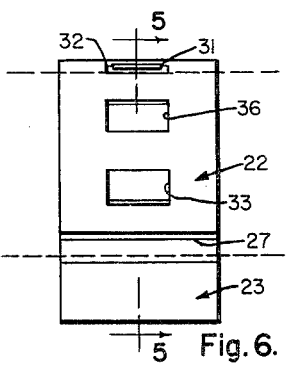
Figures 7, 8, 9, 10:
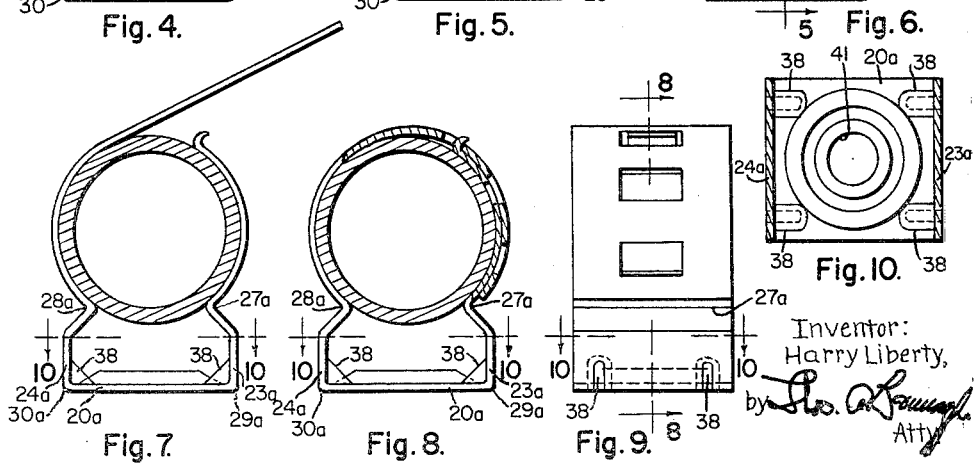

FIGURE 4 shows another sectional view taken on the same line as that of FIGURE 3; but in FIGURE 4 the wrapping ear or arm has been wrapped somewhat around the introduced pipe or cable, two positions of such wrapping being shown in this figure, one such position being shown in full lines, and a succeeding position being shown by the dashed lines, and two succeeding positions of the screw-driver or other simple tool being shown by corresponding full and dashed lines; and a third position of another tool being shown by the dash and dot lines;

FIGURE 5 shows another sectional view, also taken on the same section line as the showings of FIGURES 3 and 4; but in FIGURE 5 the wrapping operation has been completed, with corresponding hooking of the two ears or arms together in their pipe or cable clamping condition, and the wrapping ear or arm has been conveniently bent down into facial contact with the hook ear or arm so as to avoid the presence of a considerably projecting ear or arm portion after completion of the gripping operation;

FIGURE 6 shows a face view corresponding to FIGURE 5;

FIGURE 7 shows a section similar to that of FIGURE 4, but without the showing of the simple tools; and in FIGURE 7 I have shown another embodiment wherein the base portion of the unit is of form to reinforce the lower portions of the two ears or arms, and retain them against angular deflection with respect to the base, thus producing a unit in which the deformations of the ears or arms produced during the clamping operation occur principally at the V-shaped points of connection between the curved portions of such ears or arms and the vertically extending connections of such ears or arms to the base proper;

FIGURE 8 shows a section similar to that of FIGURE 5, but showing the embodiment of unit shown in FIGURE 7;

FIGURE 9 shows a right-hand side view corresponding to FIGURE 8; and

FIGURE 10 shows a horizontal section taken on the lines 10—10 of FIGURES 7, 8 and 9, looking in the directions of the arrows.

Figure 2:
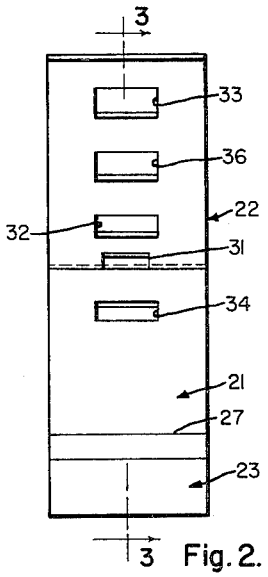
FIGURE 2 is a right-hand side face view of the embodiment shown in FIGURE 1.

Referring first to the embodiment shown in FIGURES 1 to 6, inclusive, the clamp comprises a blank or section of sheet metal, such as mild steel having some elasticity, of width such as shown in FIGURES 2 and 6. This blank includes the base portion or section 20 of width generally corresponding to the diameter of the pipe or cable to be gripped. Extending up from this base portion are the hook ear or arm 21, and the wrapping ear or arm 22. These ears or arms are of form to provide the lower sections 23 and 24, respectively, and the gripping sections 25 and 26, respectively. These latter are curved on a curvature generally corresponding to that of the pipe or cable to be gripped, such curvature extending up to a location of each ear or arm sufficient to produce embrace of approximately 110 degrees of arc of the pipe or cable at each side thereof when gripping occurs. These two curved sections 25 and 26 are also so located that when gripping occurs said sections embrace substantially opposite arcs of the pipe or cable during gripping thereof.

The unit is so formed as to provide the rather sharp junctions between the respective curved sections and the corresponding lower sections 23 and 24, such sharp junctions being shown at 27 and 28. Accordingly, when the curved sections are drawn towards each other deflection at each side of the unit may occur either at the junctions 27 and 28, or at the junctions 29 and 30 where the lower sections join the base 20, or at all such locations simultaneously, until gripping actually occurs against the surface of the pipe or cable. It is now noted that the actual gripping action occurs by forces transmitted to the upper end portions of the curved sections. This will be explained hereinafter.

In previous forms of pipe or cable clamp wherein the gripping action is produced by drawing the upper end portions of the gripping sections together by a tension element such as a bolt extended through opposing end portions of the two ears or arms it is evident that some deflection of such end portions may and will occur when tension is produced in such tension element, such as the through bolt. Accordingly, the elasticity desired in the unit in order to ensure good gripping action after the bolt has been drawn up, and under changing conditions of pipe or cable size, such as occur with expansion and contraction of such elements with temperature changes, is provided by the deflections of such end portions through which such bolt is extended. In the present embodiments of clamp I have made provision for fastening the upper end portions of the ears or arms together by a hooking action, and without the provision of such a tension element as the previously used bolts; and accordingly in my present embodiments the desired slight elasticity between the two gripping elements is produced by means other than such deflections of the upper end portions of the two gripping sections, just above referred to. This will be referred to again hereinafter.

Again referring to FIGURES 1 to 6, inclusive, in particular, the upper end of the hook section 25 is provided with an outwardly extending prong or hook 31 which is slightly reversed as shown in various figures, so that when a suitable opening of the wrapping section 26 is engaged with such prong such engagement cannot be discontinued without a slight shift of the two elements towards each other, sufficient to allow for such disengagement. But as long as the gripping action continues the hooking engagement will continue to effectively hold the upper ends of the two gripping sections locked together. The wrapping section is therefore provided with an opening 32 of width to freely accommodate the prong 31, and at location such that when effective gripping action has been produced between the two sections 25 and 26 and the opposite sides of the pipe or cable, such opening 32 may be brought down over the prong 31 and by a slight reverse movement of the wrapper section the right-hand edge of such opening 32 will be engaged with the undercut portion of the prong, effectively locking the two gripping sections of the unit together. Such locked condition is shown in FIGURE 5 of the embodiment of FIGURES 1 to 6, inclusive, and in FIGURE 8 of the embodiment of FIGURES 7, 8, 9 and 10. The means whereby the two upper end portions of the gripping elements 25 and 26 are forced towards each other with sufficient force to produce the above result, will be disclosed hereinafter.

It is now noted that in order to allow for introduction of the pipe or cable into the clamp the wrapping section 22 is conveniently formed originally with its upper portion extending generally upwardly, or it may be bent into such position just prior to the introduction of the pipe into place. This condition is shown in FIGURES 1, 2 and 3. Then, when the pipe or cable has been received between such gripping sections 25 and 26, the wrapping section may be readily bent down around the upper surface of the pipe or cable by hand pressure, to bring the opening 32 more or less into registry with the prong 31. This condition is shown by the full lines of FIGURE 4. In that figure, however, it is seen that the opening 32 is not yet in full registry with the prong so that even if the end portion of the section 22 should now be fully bent down against the upper surface of the pipe or cable, the desired registry of the prong into such opening 32 would not occur.

In various of the figures I have shown the opening 33 in the end portion of the wrapping section, and I have also shown an opening 34 formed in the hook section below the prong 31. These two openings are so located in their sections that when the wrapping section has been brought substantially into the position shown in FIGURE 4 a suitable simple tool, such as a screwdriver 35 may be set down through the opening 33 and its lower edge end may be engaged with the opening 34 as shown in FIGURE 4. Then, by pressing down on such tool the outer end portion of the wrapping section will be drawn stiffly to the right, and at the same time such outer end portion will be forced down, producing a tension force between both of the sections 21 and 22, tightening them up against the pipe or cable, and at the same time subjecting the sharp angular junctions 27 and 28 to a force which will slightly open up or increase the angles embraced by such junctions. This will allow for a slight slip of the section 22, or of the section 21, or of both such sections, on the surface of the pipe or cable, sufficient to enable the opening 32 to be brought into full registry with the prong 31. At the same time, the downward force produced on the end portion of the wrapping section, and the counter force produced on the hook section, will bring the prong into seated engagement in the opening 32, so that the desired hooking together of such two sections, with the production of a gripping force on the surface of the pipe or cable will be produced. Then by removing such tool the parts will be left in their thus locked together condition, and with the pipe or cable under a strong grip between the two sections 21 and 22.

For purposes of convenience I have also shown a second opening 36 in the wrapper section between the openings 32 and 33. This second opening is so located that by originally depressing the wrapper section into the dashed line position 37 of FIGURE 4 the simple tool 35a may be set down through this opening 36 and engaged with the opening 34 of the hook section to produce an operation similar to that described above. However, a further use of such second opening 36 is as follows:

In case it is desired to use the clamp with a pipe or cable of smaller diameter than that shown in the several figures it is possible to slightly deform the curved portions 25 and 26 of the two sections to conform to such smaller size pipe or cable. By locating the opening 32 at a position such that it may engage with the prong 31 when the unit is brought into clamping position it is then possible to use the unit for either of the two sizes of pipe or cable corresponding to the locations of the two openings 33 and 36. Additional such openings could also be provided, corresponding to additional sizes of pipes or cables to be accommodated by the unit. The material from which the clamp is made is of characteristics such as to enable deformation of the curvatures 25 and 26 to meet the requirements of the several sizes of pipes or cables to be accommodated by simple bending operations of such curvatures.

With the embodiment shown in FIGURES 1 to 6, inclusive the tension developed in the two sections 21 and 22 during the clamping operation may and generally will produce slight deformations at the locations 29 and 30 as well as at the locations 27 and 28. These deformations at the locations 29 and 30 are then due to the fact that the directions of tension produced in the two sections 21 and 22 at such locations 29 and 30 produce torques tending to straighten the angles at such locations 29 and 30.

In the embodiment shown in FIGURES 7, 8, 9 and 10 such angles 29a and 30a are right angles; but furthermore, I have also shown the unit as provided with the reinforcing or bracing elements 38 between the base portion 20 and the portions 23a and 24a, so that the pull developed during the latching operation for production of engagement of the prong 31 with the opening of the wrapping section cannot change the angle between such base section 20 and such sections 23a and 24a. Under these conditions the slight deformation needed to effect latching of the prong with the opening of the wrapping section will be accommodated at the locations 27a and 28a.

Examination of FIGURE 4 will show another possible operation for effecting the clamping of the pipe or cable. In this case a tool 39 may be used, having a small hook 40 on its lower end. By inserting such tool through the hook receiving opening 32 of the wrapping section 22 and engaging such hook 40 with the hook 31 of the hook section 21, it is possible to draw the two sections together by rocking such tool rightwardly, thus also forcing the wrapping section down until the opening 32 comes over and receives the hook 31. Thereupon such tool 39 may be disengaged, leaving the two sections hooked and locked together.

As shown in FIGURE 3 the base section 20 of the unit may be provided with a conventional hole 41 to receive a lag screw or other fastener by which the unit is attached to the structure.

I claim:

1. As a new article of manufacture, a clamp comprising a length of slightly elastic material of generally U-shape including a base section, a hook section, and a wrapping section, the hook section and the wrapping section each including a lower portion in connection with the base section, and an upper curved portion of such section, the concave surfaces of the two curved portions facing each other to receive between them a tubular element to be gripped, a hook extending radially outwardly from the end portion of the hook section and including a concave hook surface facing away from the wrapping section, together with means to latch the hook receiving opening over the hook with the curved portions of the sections in gripping engagement with the tubular element, said means including an abutment on the hook section at a location between the hook and the connection of the hook section to the base section, the wrapping section being of length to extend beyond the hook receiving opening of such section, and there being a tool receiving opening in said wrapping section at a location farther from the connection of said section to the base section than the aforesaid hook receiving opening, said tool receiving opening and the abutment being positioned, when the hook section and the wrapping section are in engagement with opposite surface portions of a tubular element, such that a tool extended through the tool receiving opening may engage said abutment of the hook element as a lever pivot to draw the end portions of the wrapping section and the hook section, into sufficient overlap, by rock of such tool, to engage the hook receiving opening over the hook for latching said elements together.

2. An article as defined in claim 1, wherein the lower portions of the hook section and the wrapping section extend substantially at right-angles to the base section.

3. An article as defined in claim 2, together with reinforcing means to retain said lower portions of the hook section and the wrapping section against angular deformation with respect to the base section.

4. An article as defined in claim 1, wherein the lower portions of the hook section and the wrapping section extend from the base section at angles other than right-angles.

5. An article as defined in claim 4, wherein the lower portions of the hook section and the wrapping section slant towards each other and wherein the inner angles between the base section and such lower portions of the hook section and the wrapping section are acute angles.

6. An article as defined in claim 1, wherein there is a plurality of openings through the wrapping section located in succession along the length of such section, each such opening being of size to receive the hook of the hook section when gripping a tubular element of size corresponding to the location of such opening.

References Cited in the file of this patent
UNITED STATES PATENTS

| | | |
|---|---|---|
| 693,182 | Stone | Feb. 11, 1902 |
| 1,735,932 | Nelson | Nov. 19, 1929 |
| 1,963,908 | Manasek | June 19, 1934 |